United States Patent
Vieux et al.

(10) Patent No.: US 10,009,341 B1
(45) Date of Patent: Jun. 26, 2018

(54) EXTERNAL KEYBOARD WITH OTP CAPABILITY

(71) Applicant: Assa Abloy AB, Stockholm (SE)

(72) Inventors: Georges Robert Vieux, Fremont, CA (US); Eric Vila, Guyancourt (FR); Janice Girouard, Austin, TX (US); Daniel Halber, Suresnes (FR)

(73) Assignee: ASSA ABLOY AB, Stockholm (SE)

( * ) Notice: Subject to any disclaimer, the term of this patent is extended or adjusted under 35 U.S.C. 154(b) by 217 days.

(21) Appl. No.: 15/166,571

(22) Filed: May 27, 2016

Related U.S. Application Data

(60) Provisional application No. 62/166,846, filed on May 27, 2015.

(51) Int. Cl.
| | |
|---|---|
| *H04L 29/06* | (2006.01) |
| *H04W 12/06* | (2009.01) |
| *H04L 9/08* | (2006.01) |
| *G06F 21/83* | (2013.01) |

(52) U.S. Cl.
CPC .......... *H04L 63/0838* (2013.01); *G06F 21/83* (2013.01); *H04L 9/0863* (2013.01); *H04L 63/0853* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 2007/0277044 | A1* | 11/2007 | Graf ................. | G07F 7/1008 713/185 |
| 2009/0241182 | A1* | 9/2009 | Jaber ................ | G06F 21/31 726/16 |
| 2016/0026258 | A1* | 1/2016 | Ou ................... | G06F 17/276 715/773 |
| 2016/0098097 | A1* | 4/2016 | Chang .............. | G06F 3/0221 345/169 |
| 2016/0294817 | A1* | 10/2016 | Tan ................... | H04L 63/0838 |

OTHER PUBLICATIONS

Advanced Card Systems Holdings Limited, "ACR38K-E1 Smart Keyboard," 2016.

* cited by examiner

*Primary Examiner* — Eleni A Shiferaw
*Assistant Examiner* — Andrew J Steinle
(74) *Attorney, Agent, or Firm* — Muirhead and Saturnelli, LLC

(57) ABSTRACT

A keyboard includes a plurality of keys, a plurality of keyboard components coupled to the keys, and one-time password (OTP) generation hardware integrated with at least some of the keyboard components, where actuating at least one of the keys causes a one-time password to be generated. The OTP generation hardware may be actuated with a dedicated button on the keyboard, by pressing a button on the keyboard that is otherwise used for pairing the keyboard to a device, or by pressing a specific sequence of keys on the keyboard. The keyboard may maintain state information to cause input by the user for OTP generation to be provide to the OTP generation hardware instead of to a device paired with the keyboard. The keyboard may also include a display that is part of the keyboard, where the display shows the one-time password generated by the OTP hardware.

22 Claims, 6 Drawing Sheets

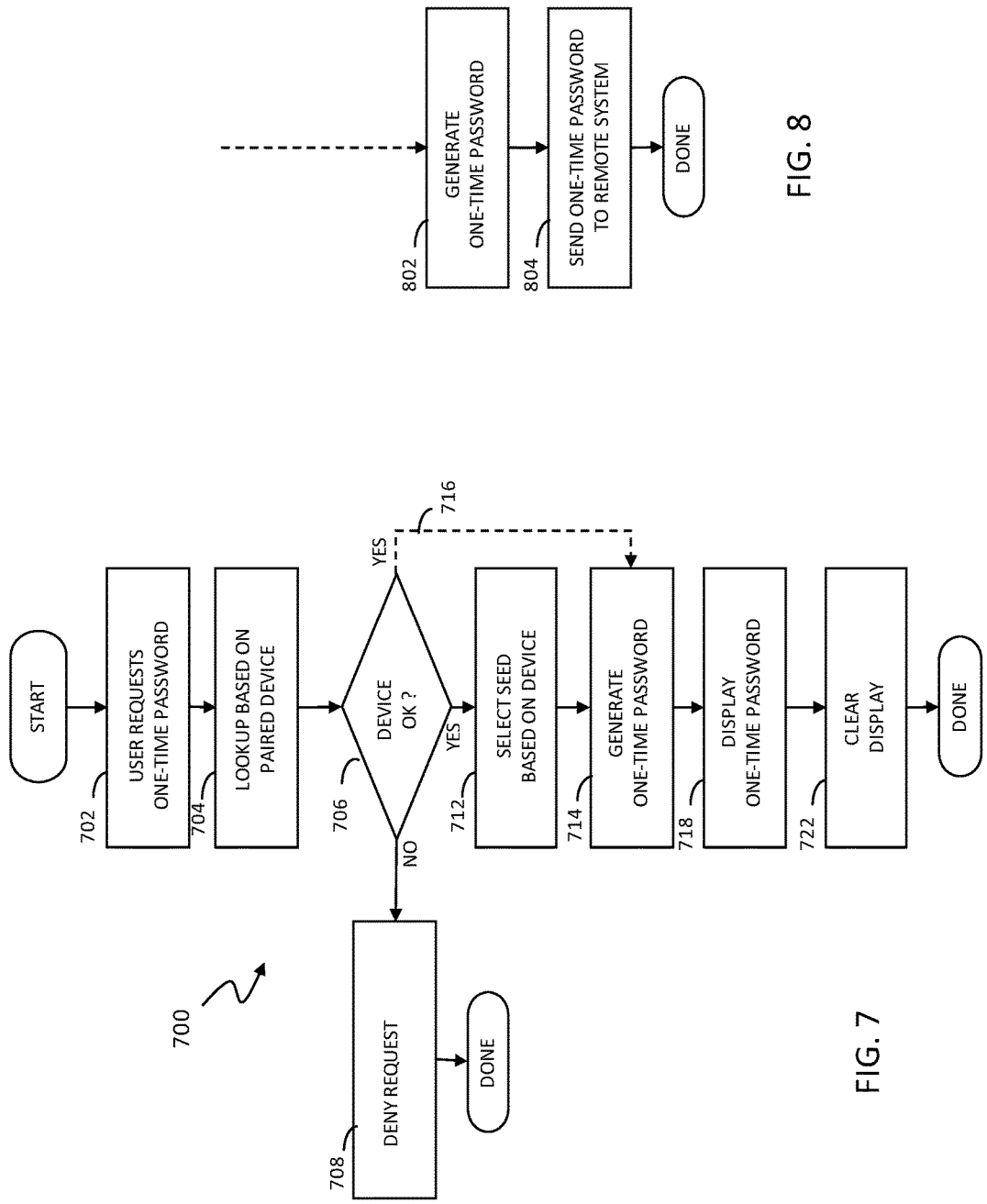

EXTERNAL KEYBOARD WITH OTP CAPABILITY

CROSS-REFERENCE TO RELATED APPLICATIONS

This application claims priority to U.S. Prov. App. No. 62/166,846, filed May 27, 2015, and entitled "EXTERNAL KEYBOARD WITH OTP CAPABILITY", which is incorporated by reference herein.

TECHNICAL FIELD

This application relates to the field of authentication and security and more particularly to the field of authentication and security using one time password authentication.

BACKGROUND OF THE INVENTION

One-Time Passwords are used for security and authentication. In some implementations, a dedicated device, (e.g., an authenticator such as a token/fob), may be used to periodically generate a series of one-time passwords that a user enters to authenticate himself to a particular system. Both the dedicated device and the particular system are initialized with a "seed" value (shared secret) and the series of one-time passwords is generated based on this seed value. The seed value is kept secret and the mechanism for generating/verifying one-time passwords may also be protected so that it is difficult/impossible to timely predict a particular one-time password in the series and so that, for example, a malicious entity cannot improperly generate a correct but unauthorized one-time password. Generally, the series of one-time passwords is pseudo-random, but based on the passage of time and/or a counter. The dedicated device may be tamper-proof in that any attempt to access the internal workings of the device to learn otherwise secret information, such as the seed value, may cause the device to stop working and, in some cases, erase/destroy sensitive information on the device.

It is also possible to use software instead of a dedicated device to generate one-time passwords. A seed value (shared secret) is transferred in a secure way to a device, such as a desktop or laptop computer, a tablet, or a smartphone, which then runs an algorithm to generate the pseudo-random sequence of one-time passwords. A user with a smartphone runs a one-time password app, which provides the user with an appropriate one-time password. Although this approach may be more convenient than using dedicated hardware, such as an authenticator, it may also be less secure since security of the seed (shared secret) and of the one-time password generation mechanism relies on the security of the device. Also, for some users, adding an app/program to their device and/or using it may be inconvenient.

Accordingly, it is desirable to provide a mechanism for generating one-time passwords that does not require dedicated hardware while, at the same time, is potentially more secure and convenient than software-only approaches.

SUMMARY OF THE INVENTION

According to the system described herein, a keyboard includes a plurality of keys, a plurality of keyboard components coupled to the keys, and one-time password (OTP) generation hardware integrated with at least some of the keyboard components, where actuating at least one of the keys causes a one-time password to be generated. The OTP generation hardware may be actuated with a dedicated button on the keyboard, by pressing a button on the keyboard that is otherwise used for pairing the keyboard to a device, or by pressing a specific sequence of keys on the keyboard. The keyboard may maintain state information to cause input by the user for OTP generation to be provide to the OTP generation hardware instead of to a device paired with the keyboard. The keyboard may also include a display that is part of the keyboard, where the display shows the one-time password generated by the OTP hardware. The one-time password generated by the OTP hardware may be displayed on a device coupled to the keyboard. The device may be a smartphone or a tablet. The one-time password may be provided directly to a remote system for access thereto without being displayed to a user. The one-time password may be generated only after a user has entered a correct value for a personal identification number (PIN), only if the keyboard is not paired to a device, or only after the keyboard has been paired to one of a plurality of specific devices that have been pre-registered for use. A different one-time password may be generated according to specific devices paired with the keyboard. Different seed values may be used to generate the different one-time passwords.

BRIEF DESCRIPTION OF THE DRAWINGS

Embodiments of the system described herein are explained with reference to the several figures of the drawings, which are briefly described as follows.

FIG. 7 is a flow diagram illustrating using a keyboard to generate an OTP according to another embodiment of the system described herein.

FIG. 8 is a flow diagram illustrating providing a generated OTP to a remote system according to an embodiment of the system described herein.

DETAILED DESCRIPTION OF VARIOUS EMBODIMENTS

The system described herein provides a mechanism for securely and conveniently generating one-time passwords using a keyboard having one-time password capability built therein. Unlike software-only approaches, the one-time password hardware may be included in the keyboard (and thus be relatively secure). In most cases in which a user expects to employ an external keyboard for a device anyway, using the keyboard to also generate one-time passwords does not require the user to have yet another device (e.g., an authenticator such as a token or fob) for generating one-time passwords.

Figure 1:
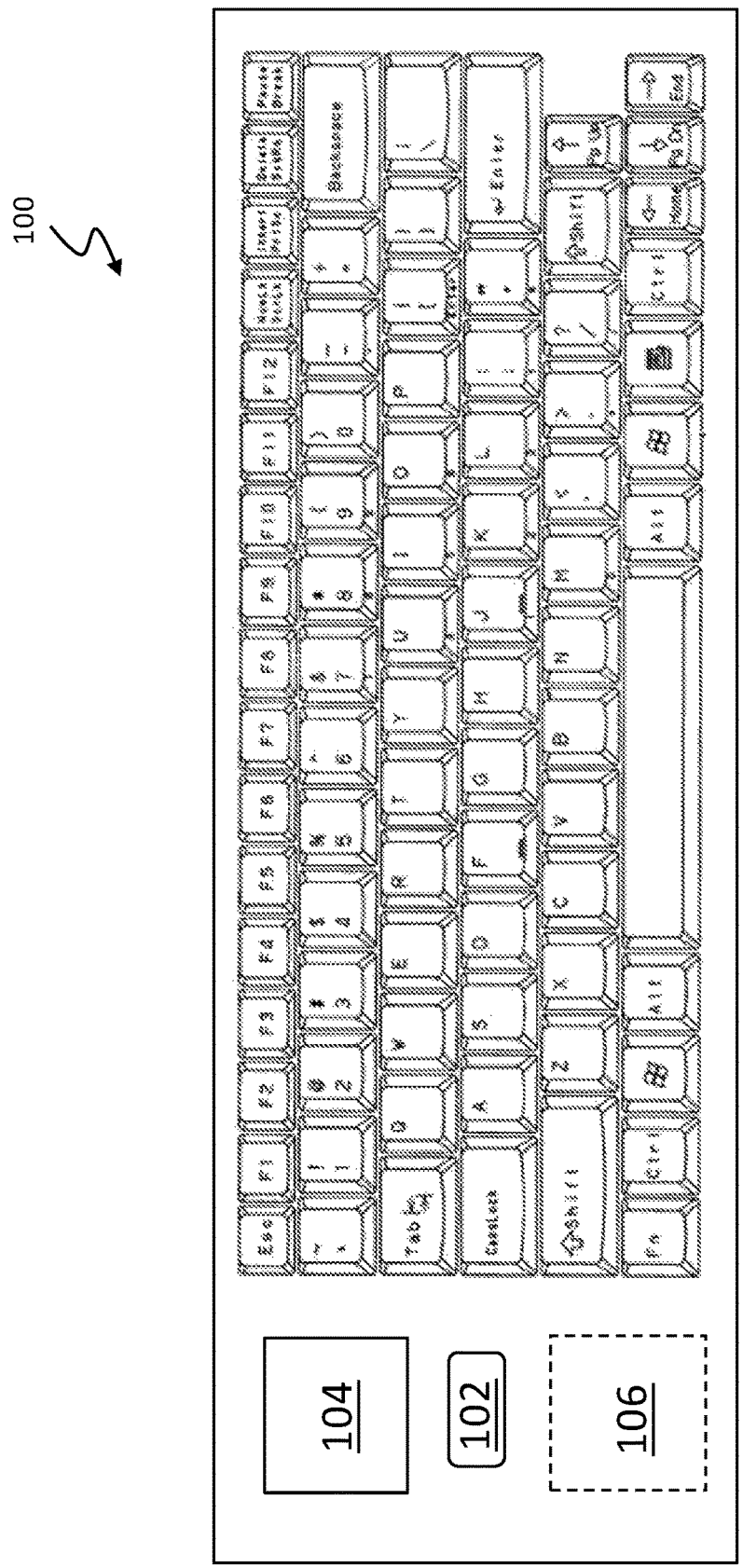
FIG. 1 is a schematic illustration showing a keyboard with OTP (one-time password) functionality according to an embodiment of the system described herein.

Referring to FIG. 1, a keyboard 100 is shown as including an OTP (one-time password) button 102, an OTP display 104, and OTP hardware 106. The keyboard 100 may include a plurality of keys that are used to provide input to a device (not shown in FIG. 1) that is coupled/paired to the keyboard 100. Note that the keyboard 100 may be broadly understood to include other types of user input devices, such as graphics tablets, game controllers, etc. In some embodiments, the keyboard may be similar to (and/or an adaption of) the ACR38K-E1 Smart Keyboard provided by Advanced Card Systems Holdings Ltd. of Hong Kong.

The OTP button 102 may be a conventional keyboard key/button that is actuateable by a user to cause a one-time password to be generated. The OTP display 104 may be part of the keyboard 100 and may be a conventional, relatively small, display that may show a generated one-time password to the user after the user has actuated the button 102. The OTP hardware 106 may be a conventional tamper-proof chip or chipset that generates one-time passwords based on seed value(s) (shared secrets) stored therein. Security provided by the keyboard 100 may be similar to security for the ACR38K-E1 keyboard, mentioned above. Note that, generally, the OTP scheme may use any type cryptography, including cryptography based on asymmetric keys, such as public key cryptography. The OTP hardware 106 may be provisioned using any appropriate mechanism, including conventional provisioning mechanisms currently used for stand-alone authenticators. In some embodiment, cryptographic functions other than OTP may be provided, such as FIDO, PKI, Windows logon, and other types of cryptography.

The OTP keyboard 100 may contain conventional keyboard components that are coupled to the keys and that provide conventional keyboard functionality, such as detecting and processing user key presses, communicating with a paired/coupled device, etc. The OTP hardware 106 may be integrated with at least some of the conventional keyboard components of the keyboard 100 so that the OTP hardware 106 is not separately removable from the keyboard 100. In some instances, the OTP hardware 106 may not even be separately identifiable from conventional keyboard components of the keyboard 100. For example, the OTP hardware 106 and the conventional keyboard components may be integrated into a single (possibly customized) chip or chipset. The OTP hardware 106 may be coupled to conventional keyboard components of the keyboard 100, including the OTP button 102 and the OTP display 104, to provide appropriate security in connection with the functionality described herein.

Figure 2:
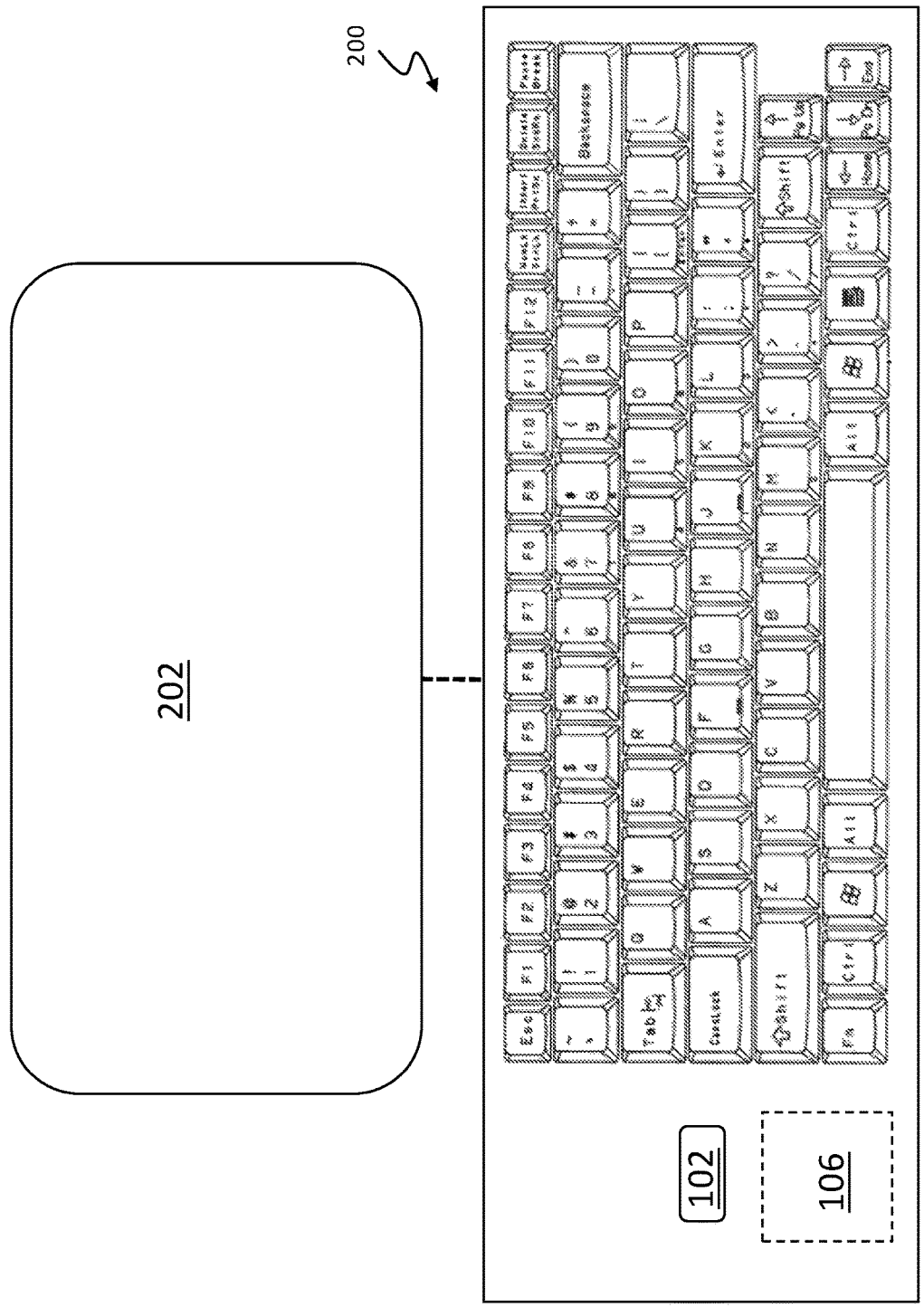
FIG. 2 is a schematic illustration showing a keyboard with OTP functionality according to another embodiment of the system described herein.

Referring to FIG. 2, a keyboard 200 is similar to the keyboard 100 described above, except that the keyboard 200 does not include an OTP display. The keyboard 200 includes the OTP button 102 and the OTP hardware 106, described above. The keyboard 200 is paired to a tablet 202 using any appropriate pairing/coupling mechanism, such as Bluetooth or a direct connection via a USB cable or any other appropriate mechanism. In operation, the tablet 202 may display a generated one-time password to the user. Thus, in the embodiment of FIG. 2, the display of the tablet 202 performs the function of the ODP display 104 in the keyboard 100 of FIG. 1. Note that it is possible to pair the keyboard 200 to a device other than the tablet 202, such as a smartphone, a laptop computer, a desktop computer, etc. Note also that it is possible to configure the system so that the one-time password is displayed on an other device of the user even though the other device is not necessarily paired to the keyboard. For example, the one-time password may be sent to a cell phone of the user (using, for example, SMS) even though the keyboard is not necessarily paired with the cell phone.

In some embodiments, an identifier of a paired device may be pre-registered for use during initial provisioning of the system and validated before an OTP is released to the device. For instance, a serial number of a particular smartphone may be pre-registered (e.g., by a security administrator) and the keyboard may be allowed to pair only with the particular smartphone (and/or only a small number of particular pre-registered devices). Displaying the OTP on a pre-registered paired device provides an additional authentication factor since the user has proven to have two things: the keyboard with OTP capability and the pre-registered paired device. For less secure environments, it is possible to allow the user to pair previously unknown devices. For more secure applications, the system may require all paired devices to be pre-registered.

Figure 3:
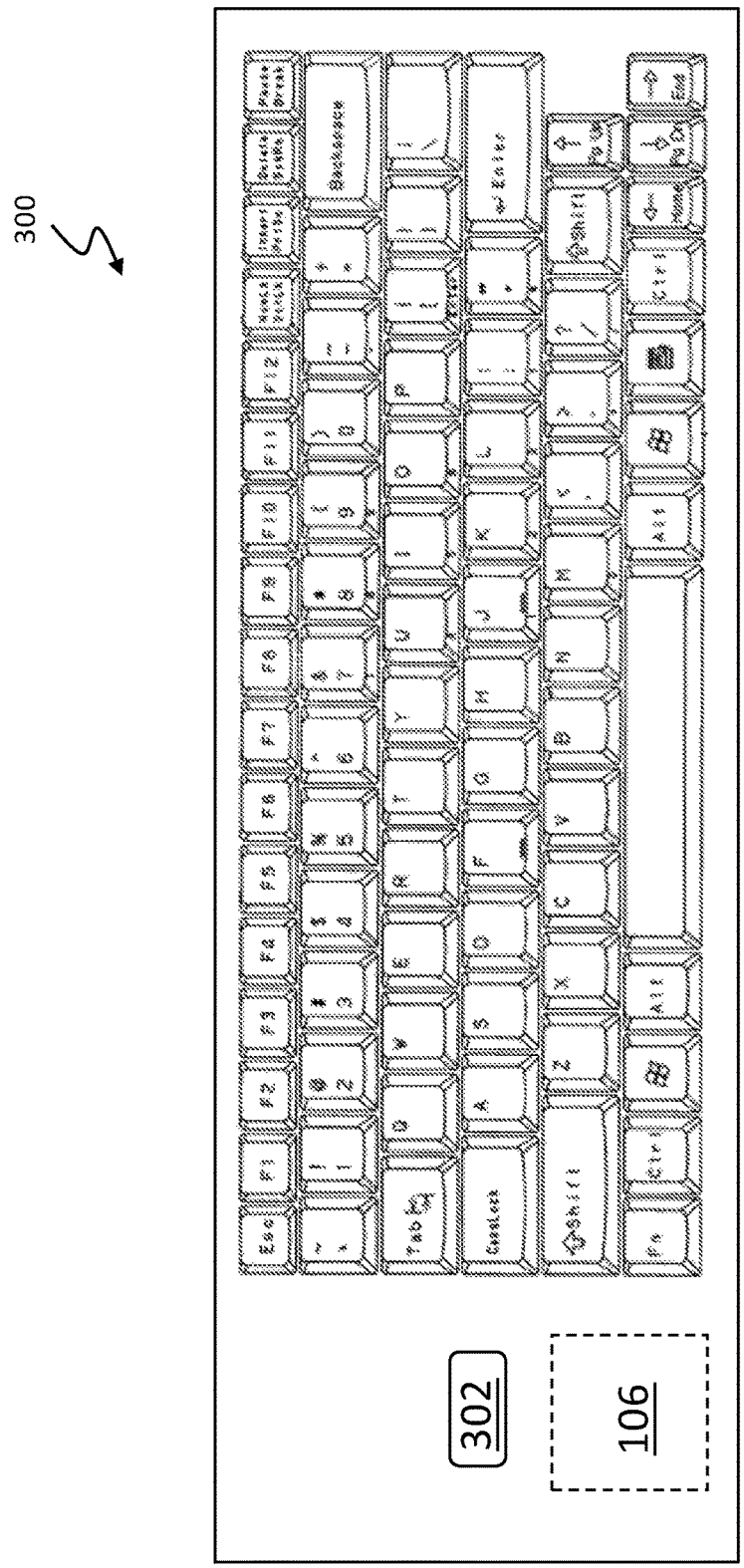
FIG. 3 is a schematic illustration showing a keyboard with OTP functionality according to another embodiment of the system described herein.

Referring to FIG. 3, a keyboard 300 is shown with a conventional connect button 302 that is used to pair the keyboard 300 to a device such as a tablet or a smart phone (not shown in FIG. 3) in a conventional fashion. The keyboard 300 may or may not include a display (not shown in FIG. 3) like the display 104 shown in the keyboard 100 of FIG. 1. In instances where the keyboard 300 does not have a display, the display of the device paired to the keyboard 300 may be used instead, as described elsewhere herein. The keyboard 300 may generate a one-time password in response to the user pressing the connect button 302 a certain way (e.g., for a certain amount of time). In some cases, the connect button 302 may only be used to initiate generation of the one-time password when the keyboard 300 is not otherwise paired with a device. In other embodiments, the connect button 302 may be used to initiate generation of a one-time password when the keyboard 300 is paired with a device.

Figure 4:
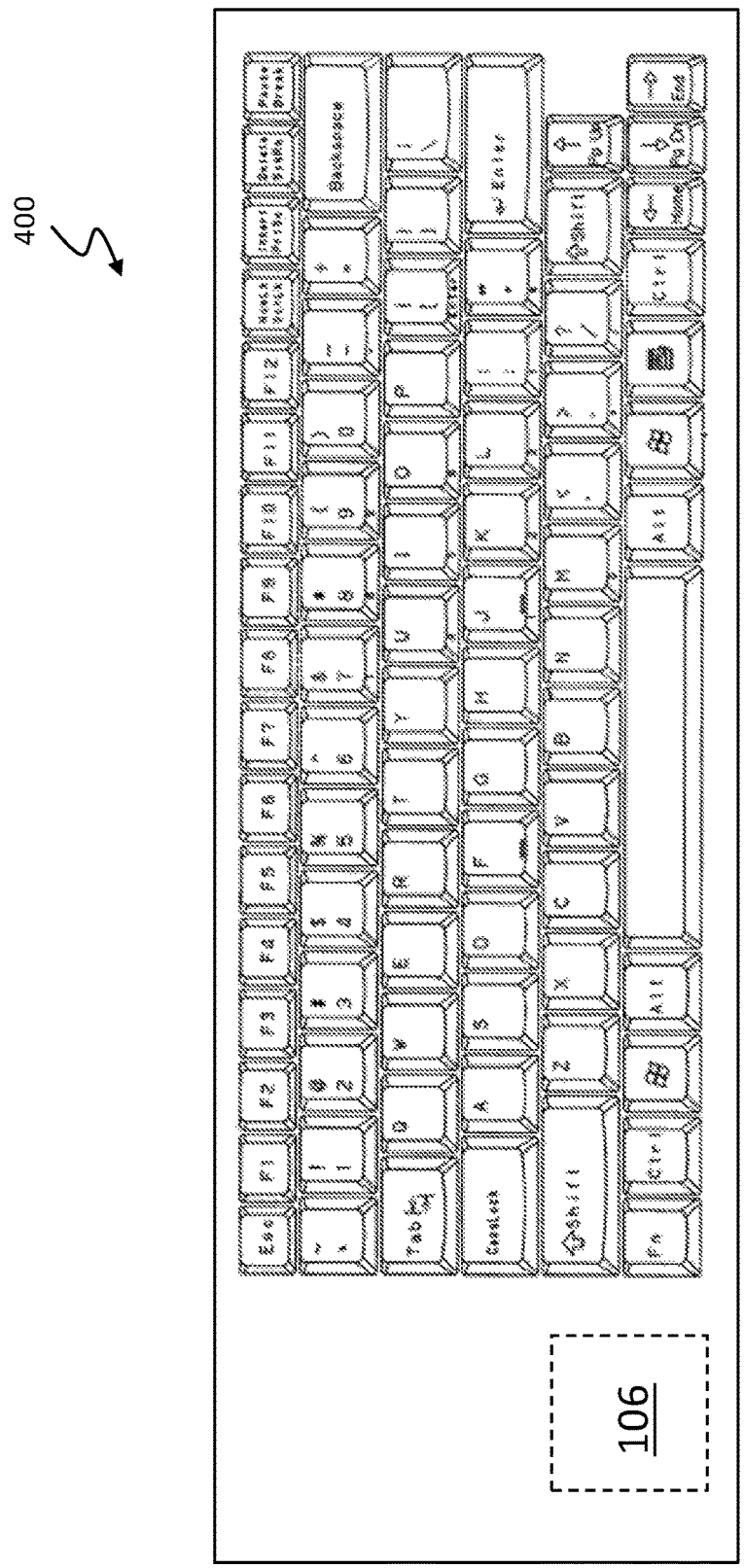
FIG. 4 is a schematic illustration showing a keyboard with OTP functionality according to another embodiment of the system described herein.

Referring to FIG. 4, a keyboard 400 is shown without any specific button that can be used for generating a one-time password. Instead, a user may initiate generation of a one-time password on the keyboard 400 by pressing a particular key combination, such as <CNTL><ALT>O (or any other appropriate combination) or by some other user input mechanism, such as by actuating a touchpad or a mouse in some way. The keyboard 400 may or may not include a connect button (not shown in FIG. 4) like the connect button 302 of the keyboard 300 FIG. 3. However, even if the keyboard 400 includes a connect button, the connect button is not used to initiate generation of a one-time password.

Figure 5:
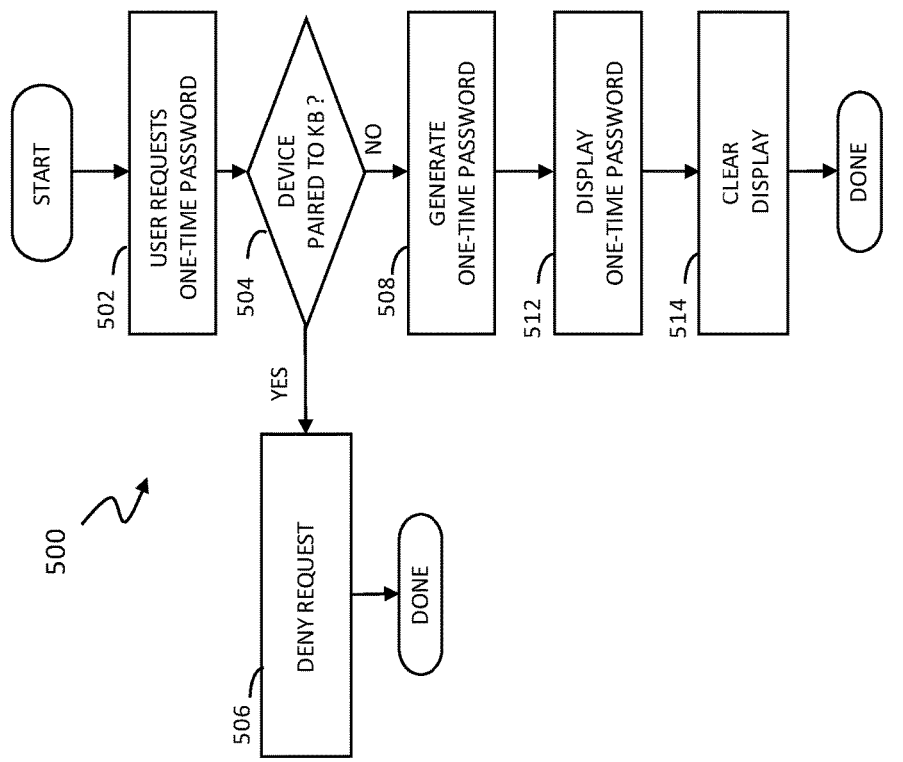
FIG. 5 is a flow diagram illustrating using a keyboard to generate an OTP (one-time password) according to an embodiment of the system described herein.

Referring to FIG. 5, a flow diagram 500 illustrates processing performed in connection with generation of a one-time password by a keyboard. Processing begins at a first step 502 where a user requests generation of a one-time password. Following step 502 is a test step 504 where it is determined if the keyboard is paired with a device. As discussed elsewhere herein, in some embodiments, a keyboard does not generate a one-time password if the keyboard is already paired with a device. If it is determined at the test step 504 that the keyboard is paired with a device, then control transfers from the test step 504 to a step 506 where the request for generation of a one-time password is denied. In some embodiments, a message may be provided to the user indicating that the one-time password has not been generated and also indicating the reason why. In other embodiments, the user is not provided with a message, but instead, the user may infer that the request was denied because no one-time password has been generated. Following step 506, processing is complete.

If it is determined at the test step 504 that the keyboard is not paired to a device, then control passes from the test step 504 to a step 508 where a one-time password is generated (i.e., by the OTP hardware 106). Following step 508 is a step 512 where the OTP generated at the step 508 is displayed to the user. As discussed elsewhere herein, the generated OTP may be displayed on a display of the keyboard or on a display of a different device. Following step 512, control transfers to a step 514 where the display is cleared (of the generated OTP) after a predetermined amount of time. Following step 514, processing is complete.

Figure 6:
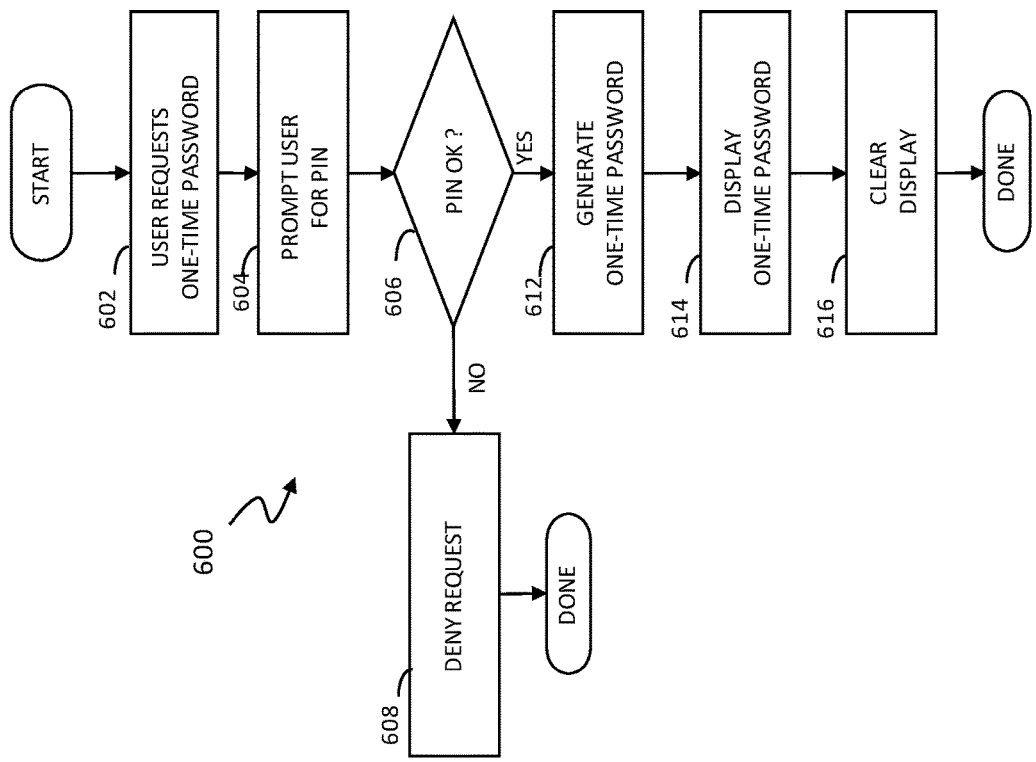
FIG. 6 is a flow diagram illustrating using a keyboard to generate an OTP according to another embodiment of the system described herein.

Referring to FIG. 6, a flow diagram 600 illustrates another embodiment of processing performed in connection with generation of a one-time password by a keyboard. Processing begins at a first step 602 where a user requests generation of a one-time password. Following step 602 is a step 604 where a user is prompted to enter a personal identification number (PIN). In the embodiment illustrated by the flow diagram 600, the user provides a PIN (i.e., password) that is known to the user and thus is proof of the identity of the user. Requiring the user to provide a PIN (or similar) provides an added level of security than that provided by the embodiment of FIG. 5. Requiring the PIN results in a system where the user must both possess the keyboard (something you have) and know the PIN (something you know).

In instances where the user is prompted to provide input, the keyboard may maintain state information so that user inputs related to OTP functions (such as a PIN input) are not forwarded to a paired device but, instead, are used for the OTP functions. Maintaining the state information also causes non-OTP related user input to be directed to a device paired to the keyboard rather than to the OTP generation mechanism of the keyboard (e.g., the OTP hardware 106). In an embodiment, the keyboard may enter a special state where user input is used for OTP functions (e.g., PIN entry) in response to the user initiating the OTP functions (e.g., pressing the OTP button 102). In the special state, user inputs are forwarded to the OTP hardware 106 (or similar) and not to any device paired to the keyboard. The keyboard leaves the special state and returns to a "normal" state after the user has completed the OTP functions (i.e., the user has finished entering a PIN value) or the system has timed out. In the normal state, user keyboard inputs are directed to a device paired to the keyboard in a conventional manner and not to the OTP hardware 106.

Following the step 604 is a test step 606 where it is determined if the PIN entered by the user at the step 604 is correct. If not, then control transfers from the test step 606 to a step 608 where the request for generation of a one-time password is denied. In some embodiments, a message may be provided to the user indicating that the one-time password has not been generated and also indicating the reason why. In other embodiments, the user is not provided with a message, but instead, the user may infer that the request was denied because no one-time password has been generated. Following step 608, processing is complete.

If it is determined at the test step 606 that the PIN entered by the user at the step 604 was correct, then control passes from the test step 606 to a step 612 where a one-time password is generated (i.e., by the OTP hardware 106). Following step 612 is a step 614 where the OTP generated at the step 612 is displayed to the user. As discussed elsewhere herein, the generated OTP may be displayed on a display of the keyboard or a display of a different device. Following step 614, control transfers to a step 616 where the display is cleared (of the generated OTP) after a predetermined amount of time. Following step 616, processing is complete.

In some embodiments, it is possible to have the OTP hardware 106 always generate an OTP value irrespective of PIN entry by the user, where the user provides both the generated OTP and the PIN to follow on authentication which verifies both. In such a case, the OTP hardware may not be configured to accept/use a PIN value. Note also that, in this embodiment, a new value for the OTP (i.e., the next OTP) may be generated and displayed automatically without any user input (e.g., every thirty seconds).

In other embodiments, the user inputs the PIN to the OTP hardware 106, which generates a passcode based on an internally-generated OTP and the PIN entered by the user. The passcode is provided to follow on authentication for verification. In this instance, the passcode may simply be a concatenation of the PIN and the OTP. In other instances, the PIN and OTP may be mathematically combined in a way that prevents easy (or any) detection/determination of either the PIN or the OTP from the passcode.

Referring to FIG. 7, a flow diagram 700 illustrates another embodiment of processing performed in connection with generation of a one-time password by a keyboard. Processing begins at a first step 702 where a user requests generation of a one-time password. Following step 702 is a step 704 where the system uses the device to which the keyboard is paired to look up whether an OTP should be generated. In the embodiment illustrated by the flow diagram 700, OTP generation is based on the particular device paired with the keyboard. Thus, for example, the keyboard may generate an OTP for user A when the particular smartphone of user A is paired with the keyboard, but may not generate an OTP for user B when the particular smartphone of user B is paired with the keyboard. The system may use any appropriate mechanism to identify particular devices paired with the keyboard, such a serial number of the device, geographic location information, an identifier pushed to the device when the device and keyboard were initially paired, and/or user attribute data (i.e., a database indicating which users use which devices). Requiring the keyboard to be paired with a particular device or set of devices provides an added level of security than that provided by the embodiment of FIG. 5 since the user must possess both the keyboard and the specific device.

Following the step 704 is a test step 706 where it is determined if the particular device determined by the user at the step 704 corresponds to a device for which an OTP should be generated. If not, then control transfers from the test step 706 to a step 708 where the request for generation of a one-time password is denied. In some embodiments, a message may be provided to the user indicating that the one-time password has not been generated and also indicating the reason why. In other embodiments, the user is not provided with a message, but instead, the user may infer that the request was denied because no one-time password has been generated. Following step 708, processing is complete.

If it is determined at the test step 706 that an OTP should be generated for the user based on the paired device, then control passes from the test step 706 to a step 712 where the system selects a particular seed (shared secret) based on the particular device paired with the keyboard. In an embodiment herein, a different OTP may be generated for different users (and/or different groups of users) based on the particular device paired with the keyboard (which corresponds to the particular user). Thus, for example, if a smartphone of user A is paired with the keyboard, then the system may generate a first OTP using a first seed value (shared secret) while if a smartphone of user B is paired with the keyboard, then the system may generate a second OTP, different and independent from the first OTP, using a second seed value (shared secret). Following the step 712 is a step 714 where the one-time password is generated (i.e., by the OTP hardware 106). Note that the step 712 may be optional (i.e., the same OTP is generated for all authorized users), which is indicated by an alternative path 716 that omits the step 712.

Following step 714 is a step 718 where the OTP generated at the step 714 is displayed to the user. As discussed elsewhere herein, the generated OTP may be displayed on a display of the keyboard or a display of a different device. Following step 718, control transfers to a step 722 where the display is cleared (of the generated OTP) after a predetermined amount of time. Following step 722, processing is complete.

Note that the different embodiments described herein may be combined in any appropriate manner. For example, it is possible to prompt a user for a PIN and subsequently confirm the value entered by the user, as illustrated by the flow diagram 600 of FIG. 6, in combination with confirming the particular device paired with the keyboard, as illustrated by the flow diagram 700 of FIG. 7. Requiring the user to provide a PIN (or similar) and requiring that the keyboard be paired with a particular device or set of devices provides an added level of security than that provided by either the embodiment of FIG. 5 or the embodiment of FIG. 6. Requiring the PIN and a particular device results in a system where the user must possess the keyboard (something you have), must possess the specific device (another something you have) and know the PIN (something you know).

Note also that some or all of the functionality of the OTP hardware 106 may be moved to another device, such as a device paired with the keyboard. For example, the OTP hardware 106 in the keyboard 100 may contain only seed value(s) (shared secret(s)) for OTP generation, but another processor on another device (and/or a general purpose processor on the keyboard 100) may be used to generate the OTP from the seed value(s) (shared secret(s)). In such a case, the keyboard may still maintain state information so that user inputs related to OTP generation (such as a PIN input) are not forwarded to a paired device but, instead, are used for OTP generation, as described elsewhere herein.

Referring to FIG. 8, a flow diagram 800 illustrates an alternative embodiment where the generated OTP is provided to a follow on device, such as a remote system. As discussed elsewhere herein, in some instances the OTP is not displayed to the user but, instead, is provided to systems that use the OTP for authentication. For example, a user may log in to a remote company database using an OTP (either alone or with other authentication information). In such a case, the OTP may be provided directly from the keyboard and/or from a device paired to the keyboard to the remote database. Note that, in some cases, it is possible to both display the OTP to the user and provide the OTP to other systems.

The flow diagram 800 assumes processing has already occurred to allow the OTP to be generated (e.g. the user has entered a proper PIN value). Following this is a step 802 where the OTP is generated, as discussed elsewhere herein. Following the step 802 is a step 804 where the OTP is provided to a remote system (by the keyboard directly and/or by a device paired to the keyboard). Following the step 804, processing is complete.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system, or possibly no operating system at all.

Other embodiments of the invention will be apparent to those skilled in the art from a consideration of the specification or practice of the invention disclosed herein. It is intended that the specification and examples be considered as exemplary only.

What is claimed is:

1. A keyboard, comprising:
    a plurality of keys;
    a plurality of keyboard components coupled to the keys; and
    one-time password (OTP) generation hardware integrated with at least some of the keyboard components, wherein the OTP generation hardware is actuated by pressing a button on the keyboard that is otherwise used for pairing the keyboard to a device and wherein the one-time password is generated only if the keyboard is not paired to a device.

2. A keyboard, according to claim 1, wherein the keyboard maintains state information to cause input by the user for OTP generation to be provided to the OTP generation hardware instead of to a device paired with the keyboard.

3. A keyboard, according to claim 2, further comprising:
    a display that is part of the keyboard, wherein the display shows the one-time password generated by the OTP hardware.

4. A keyboard, according to claim 2, wherein the one-time password generated by the OTP hardware is displayed on a device coupled to the keyboard.

5. A keyboard, according to claim 4, wherein the device is one of: a smartphone and a tablet.

6. A keyboard, according to claim 2, wherein the one-time password is provided directly to a remote system for access thereto without being displayed to a user.

7. A keyboard, according to claim 2, wherein the one-time password is generated only after a user has entered a correct value for a personal identification number (PIN).

8. A keyboard, comprising:
    a plurality of keys;
    a plurality of keyboard components coupled to the keys; and
    one-time password (OTP) generation hardware integrated with at least some of the keyboard components, wherein the OTP generation hardware is actuated by pressing a button on the keyboard that is otherwise used for pairing the keyboard to a device and wherein the one-time password is generated only after the keyboard has been paired to one of a plurality of specific devices that have been preregistered for use.

9. A keyboard, according to claim 8, wherein the keyboard maintains state information to cause input by the user for OTP generation to be provide to the OTP generation hardware instead of to a device paired with the keyboard.

10. A keyboard, according to claim 8, further comprising:
 a display that is part of the keyboard, wherein the display shows the one-time password generated by the OTP hardware.

11. A keyboard, according to claim 8, wherein the one-time password generated by the OTP hardware is displayed on a device coupled to the keyboard.

12. A keyboard, according to claim 11, wherein the device is one of: a smartphone and a tablet.

13. A keyboard, according to claim 8, wherein the one-time password is provided directly to a remote system for access thereto without being displayed to a user.

14. A keyboard, according to claim 8, wherein the one-time password is generated only after a user has entered a correct value for a personal identification number (PIN).

15. A keyboard, comprising:
 a plurality of keys;
 a plurality of keyboard components coupled to the keys; and
 one-time password (OTP) generation hardware integrated with at least some of the keyboard components, wherein the OTP generation hardware is actuated by pressing a button on the keyboard that is otherwise used for pairing the keyboard to a device and wherein a different one-time password is generated according to specific devices paired with the keyboard.

16. A keyboard, according to claim 15, wherein the keyboard maintains state information to cause input by the user for OTP generation to be provide to the OTP generation hardware instead of to a device paired with the keyboard.

17. A keyboard, according to claim 15, further comprising:
 a display that is part of the keyboard, wherein the display shows the one-time password generated by the OTP hardware.

18. A keyboard, according to claim 15, wherein the one-time password generated by the OTP hardware is displayed on a device coupled to the keyboard.

19. A keyboard, according to claim 18, wherein the device is one of: a smartphone and a tablet.

20. A keyboard, according to claim 15, wherein the one-time password is provided directly to a remote system for access thereto without being displayed to a user.

21. A keyboard, according to claim 15, wherein the one-time password is generated only after a user has entered a correct value for a personal identification number (PIN).

22. A keyboard, according to claim 15, wherein different seed values are used to generate the different one-time passwords.

\* \* \* \* \*